(12) United States Patent
Minear et al.

(10) Patent No.: US 12,184,396 B2
(45) Date of Patent: Dec. 31, 2024

(54) SYSTEM AND METHOD FOR SPACE DOMAIN AWARENESS USING A SPARSE WIDELY-SPACED RADAR APERTURE

(71) Applicant: SPECIALIZED ARRAYS, INC., Indialantic, FL (US)

(72) Inventors: Kathleen Marie Minear, Palm Bay, FL (US); G. Patrick Martin, Merritt Island, FL (US)

(73) Assignee: SPECIALIZED ARRAYS, INC., Indialantic, FL (US)

( * ) Notice: Subject to any disclaimer, the term of this patent is extended or adjusted under 35 U.S.C. 154(b) by 765 days.

(21) Appl. No.: 17/116,251

(22) Filed: Dec. 9, 2020

(65) Prior Publication Data

US 2024/0405861 A1    Dec. 5, 2024

Related U.S. Application Data

(60) Provisional application No. 62/945,604, filed on Dec. 9, 2019.

(51) Int. Cl.
| | |
|---|---|
| *H04B 7/195* | (2006.01) |
| *G01S 13/58* | (2006.01) |
| *G01S 13/93* | (2020.01) |
| *H01Q 1/28* | (2006.01) |

(52) U.S. Cl.
CPC ............ *H04B 7/195* (2013.01); *G01S 13/58* (2013.01); *G01S 13/93* (2013.01); *H01Q 1/288* (2013.01)

(58) Field of Classification Search
None
See application file for complete search history.

(56) References Cited

U.S. PATENT DOCUMENTS

| | | | |
|---|---|---|---|
| 7,970,365 B2 | 6/2011 | Martin et al. | |
| 9,969,634 B2 | 5/2018 | Valdes Simancas | |
| 9,989,634 B2 | 6/2018 | Minear et al. | |
| 2010/0039228 A1* | 2/2010 | Sadr | G01S 5/12 340/10.1 |
| 2015/0197248 A1* | 7/2015 | Breed | G08G 1/09626 340/905 |

OTHER PUBLICATIONS

CN111969332 translation (Year: 2020).*

* cited by examiner

*Primary Examiner* — Whitney Moore
(74) *Attorney, Agent, or Firm* — Jacob M. Ward; Ward Law Office LLC (57) ABSTRACT

The present technology describes a widely-spaced antenna radar array for Space Domain Awareness capable of object detection, characterization, imaging and, if unfriendly, threat mitigation. It features (1) very high angular resolution due to the very wide spacing of the sensors, enabling the detection of baseball size objects in GSO, (2) operation at high frequencies enabling characterization of smaller objects because of the ability to mitigate tropospheric effects, (3) operation at varied frequencies enabling threat mitigation and imaging, (4) immediate orbit determination in a single pass without the need for long-arc tracking due to the wide spacing and high precision angle of arrival (AOA) and (5) mitigation of grating lobes caused by the sparse antenna configuration, enabling the sensors to be placed at great distances.

19 Claims, 9 Drawing Sheets

SYSTEM AND METHOD FOR SPACE DOMAIN AWARENESS USING A SPARSE WIDELY-SPACED RADAR APERTURE

CROSS-REFERENCE TO RELATED APPLICATIONS

This application claims the benefit of U.S. Provisional Application. No. 62/945,604 filed on Dec. 9, 2019. The entire disclosure of the above application is incorporated herein by reference.

FIELD

The present disclosure relates to Space Situational Awareness (SSA), recently renamed Space Domain Awareness (SDA), more particularly, to a radar system and method for object detection, characterization, and threat mitigation.

INTRODUCTION

This section provides background information related to the present disclosure which is not necessarily prior art.

With the ever-increasing reliance on Space-based assets for military, commercial and civilian applications, the need to monitor and protect these assets has become essential. Defensive and offensive counter-space operations require both surveillance and threat mitigation. This is of importance for Space-based assets in all orbits including low, medium, geosynchronous, and high Earth Orbits, LEO, MEO, GEO and HEO, respectively. The focus of this invention is on station-kept, synchronous orbits, particularly geosynchronous orbits (GSO), although the invention is not limited to this region of Space. Synchronous orbits, defined here includes orbits equal to, or multiples of, the Earth's rotational period. These objects require station-keeping to maintain their orbit.

Current ground RF radar monitoring systems are limited as to the range and/or size of the objects that they can detect and characterize and their ability to mitigate threats. Additionally, ground-based optical monitoring systems are limited by lighting conditions, cloud cover and local weather and therefore do not provide 24/7 surveillance. An always available, very high-resolution radar system able to mitigate threats will fill this gap.

The current state-of-the art, RF ground-based surveillance system is a very large traditional S-band phased array, called Space Fence, located at Kwajalein Atoll, Marshall Islands at about 9 degrees latitude, 168 degrees longitude. It went online in 2020 and will be used to monitor and characterize objects primarily in Low Earth Orbit, (LEO) and Medium Earth Orbit, (MEO). Much smaller, traditional phased array systems such as the LeoLabs S-band radars are limited to close range objects (LEO). Even despite the larger length of Space Fence (~40 m), it can only provide limited angular resolution on a target (~540 m at GSO). Therefore, both require long-arc tracking of each object. Furthermore, neither are adaptable to mitigating threats due to frequency limitations.

Applicant has previously disclosed a system and method for detection and one-pass accurate orbit determination, without the need for long arc tracking, of propagating Earth-orbiting objects, as described in commonly-owned U.S. Pat. No. 9,989,634 to Minear et al., issued Jun. 5, 2018, the entire disclosure of which is incorporated herein by reference.

All orbits decay without active intervention. Orbital trajectory parameters can be affected by perturbation forces, such as atmospheric drag and the Earth's non-uniform gravity in the case of lower orbiting objects, and solar and lunar gravitational effects (e.g., third-body perturbations) for higher orbiting objects. Additionally, solar radiation pressure can affect small debris. The system disclosed in U.S. Pat. No. 9,989,634 was based on the physics of non-station-kept Earth-orbiting objects. These objects will pass through a staring beam of a system located on or near the Equator and pointing toward the Equatorial plane. Further, a low elevation stare provides more object time in the beam than pointing straight up. One-pass orbit characterization, without long arc tracking, can be accurately calculated and the object's orbital elements can be added to a database for routine orbit maintenance. However, not all Earth-orbiting objects are propagating. These will not pass through the beam of a sensor located on the Equator and staring at the horizon. Therefore, there is a need for a system and method that can be used for station-kept, Earth orbiting objects such as geosynchronous objects. Geosynchronous orbits (GSO) have an orbital period that matches the Earth's rotation on its axis, that is, 23 hours, 56 minutes, and 4 seconds (one sidereal day). If the orbit inclination is zero, the object orbits the Equator and is called geostationary. It is a circular orbit with an angular velocity equal to the Earth's.

Most traditional radars obtain good range and range rate, but poor cross range. This means that obtaining a target's 3D position can require the radar to track the object for long enough time to develop a significant angular arc. A traditional radar antenna can provide cross range target position estimates, but the accuracy can be inadequate for applications such as geosynchronous equatorial orbit (GEO) co-orbiter detection. Typically, this is accomplished with a "monopulse" pattern in which an aperture is partitioned into a sum beam, azimuth, and elevation difference beams. The monopulse resolution is typically 5-10% of the antenna beamwidth. The antenna beamwidth is proportional to $\lambda$ (transmission frequency in wavelengths) divided by D, where D is the diameter in the case of a circular aperture. If the aperture is rectangular, there are two orthogonal beamwidths determined by the aperture extents. The antenna beamwidths are then proportional to $\lambda$ and each of the two extents, $D_1$ and $D_2$. The highest resolution is attained from the longest extent. Realizable cross range resolution can then be about $0.1*\text{range of the radar}*\lambda/D$.

Typical radar antennas can vary from a few tens to a few hundreds of wavelengths. For example, a large radar such as Space Fence, which is about 40 meters in its longest dimension, $D_1$, an angular resolution of about 150 microradians at S-band results. At a GEO altitude, this gives a cross-range resolution of about 540 meters. Undesirably, even if such an array were to stare instead of track, the array would not have angular resolution commensurate with its range resolution (typically on the order of a few meters).

There is a continuing need for a high precision 3D object positioning radar system with both good range and cross-range resolution. Desirably, the system and method could be used for object imaging and threat mitigation using the increased EIRP (RF energy) from this widely-spaced coherent transmit arraying technology.

SUMMARY

In concordance with the instant disclosure, a radar system and method to detect, characterize, and image objects in synchronous orbits, and can mitigate threats from co-orbiters, has been surprisingly discovered. In one pulse through using angle of arrival (AOA) this 3D position is found. With a second measurement the differential position or cross-range velocity is determined.

In certain examples, radar systems for detecting and characterizing a space object can include a first sensor array. The first sensor array can have a plurality of first elements. The plurality of first elements can be arranged in a widely-spaced configuration. The first elements can form one of a first aperiodic lattice, a first unequal element pattern, and a combination thereof. The first elements can be configured to perform one of transmitting operations, receiving operations, and a combination thereof. The receiving operation can include generating a first receiving signal for at least one space object. The receiving operation can also include simultaneously generating a receiving signal for each space object where there is more than one space object. The first elements can be not co-linear with respect to x- and y-axes thereof.

In certain embodiments, methods for synchronous object characterization of one or more Earth orbiting objects can include providing a system, as described herein, where the system can stare at a predetermined position in the geostationary orbit arc by broadcasting a first beam. The first beam can include a first detection signal. The system can receive at least one return signal created by the first detecting signal reflecting off the space object. The method can also include performing an incremental scanning/staring along the Equatorial arc by staring at positions for a specified dwelling time. This will comprehensively find all non-propagating objects because they will cross the equatorial plane at a repeated (right ascension of the ascending node) RAAN (and descending node as well), so an array on or near the equator incrementally scanning/staring along the Equatorial arc at the RAAN longitude will see this synchronous object.

The present technology describes a widely-spaced antenna radar array for space domain awareness and threat mitigation capable of (1) very high angular resolution due to the very wide spacing of the sensors, enabling the detection of baseball size objects in GSO, (2) operation at high frequencies enabling characterization of smaller objects because of the ability to mitigate tropospheric effects, (3) operation at varied frequencies enabling threat mitigation, (4) immediate orbit determination in a single pass without the need for long-arc tracking due to the wide spacing of the elements and high precision angle of arrival (AOA) and (5) mitigation of grating lobes caused by the sparse antenna configuration, enabling the sensors to be placed at great distances.

The radar system can be made up of large ground reflector antennas coherently combined or other sensor types including phased array units themselves, coherently combined. The arrays of receive and transmit antennas do not need to be co-located, although they can. Although unnecessary, an equatorial location would facilitate one-dimensional scans (elevation-only). With three systems placed about 120 degrees apart in longitude, the network would potentially provide comprehensive coverage of all synchronous objects.

Another unique feature is that the system does not require the use of external assets, such as satellites or towers, to correct the phase errors continually and periodically amongst the widely-spaced sensors.

The present technology can supplement the one described in U.S. Pat. No. 9,989,634 by concentrating on objects that are slowly or non-propagating such as geosynchronous equatorial orbit (GEO) and graveyard due to the sensitivity, but also low Earth orbit (LEO), medium Earth orbit (MEO), and highly elliptical orbit (HEO) that are kept in synchronous orbits via station-keeping. The present technology can relate to non-propagating Earth-orbiting objects such as those that trace the same path over the Earth at regular time intervals. Such orbits are termed synchronous. The orbital period is a multiple of the Earth's rotational period. Special cases of synchronous orbits are semi-synchronous (2 orbits per day) and geosynchronous. Geostationary is a special case of a geosynchronous orbit. It has zero inclination (e.g., circular). Geostationary objects appear in the same point in the sky from a point on the Earth. The system's location, on the Equator, can be the optimal choice for both propagating and non-propagating objects. However, the orientation can differ. In U.S. Pat. No. 9,989,634 the system stared at a low elevation toward the Equator. It focused on comprehensive cataloging of all Earth-propagating objects which will eventually pass through its beam due to orbital mechanics; most within just months. By contrast, the present technology does not stare in the same way. It can perform an incremental, slow (e.g., elevation only), scan of the GEO arc or can be tasked to do surveillance of a particular region of interest, such as for co-orbiter detection, imaging and/or threat mitigation. Furthermore, in tasked mode, it can monitor and mitigate objects not in geosynchronous orbits as well. So, while the previous patent was limited to non-station kept Earth-propagating objects, this invention provides a solution for monitoring and mitigating objects in any orbit whether they be Earth propagating or non-propagating such as in geostationary orbits.

The present technology can have significantly increased angular resolution over traditional phased arrays enabling detection and characterization of much smaller objects in higher orbits. In particular, the present disclosure can relate to detection and rapid orbit determination without the need for long arc tracking. Additionally, it can relate to Space Domain Awareness countermeasures such as disrupting of unfriendly satellites (e.g., co-orbiters) using the combined power and resolution of a sparse widely-spaced aperture. The number of elements is expandable enabling very high EIRP on a target. As the number of elements doubles, the EIRP increases by 6 dB. For example, four elements provide 12 dB EIRP increase over a single element. Additionally, it can relate to comprehensive cataloging of synchronous objects as well as tasked monitoring of the objects. Further it can relate to the detection, characterization, imaging and/or mitigation of satellites in close proximity as in the case of unfriendly co-orbiters. In certain examples, the present disclosure can be configured in a way that is described as mono-static, however, bi- and multi-static implementations can also be feasible.

Advantageously, the present technology provides many desirable benefits and advantages, which can include the following aspects. The elements can be widely-spaced due to the ability to mitigate grating lobe effects. Due to the wide spacing of the elements, high precision angle-of-arrival (AOA) can be used to characterize the object's orbit parameters, whereas other systems can only obtain such parameters by tracking. Characterization of the object's orbit parameters can be rapidly available with only two measurements. Unlike the prior art, the present technology, does not require or utilize external assets (e.g., satellites) for phase/time synchronization or calibration of the antennas in the array(s). The equatorial locations of the present systems can facilitate one-dimensional scans (e.g., elevation-only) and provide comprehensive coverage of all GEO objects. The present systems can further operate at higher frequencies, where the troposphere affects coherent combining of the antennas, by using signals including beacons from nearby GEO SATS, enabling the present technology to detect and characterize smaller objects.

In an exemplary embodiment, the present technology does not include a tracking system. The system can be capable of high very angular resolution without having to track the object. It can attain three-dimensional (3D) position and velocity (through multiple position measurements) of the object as it passes through the beam using precision AOA and precision range. The present technology can reliably achieve much better cross-range resolution which is proportional to A/D, since D is the diameter of the array, not that of a single antenna in the array. With this very wide element spacing, the resolving power needed for immediate accurate detection and orbit determination can also be used to resolve objects close to one another in the GEO arc. For example, with a one-mile diameter sparse array, at X-band, objects as close in proximity as 10 meters in GEO can be resolved. This allows for mapping of objects including debris and small satellites along the GEO arc.

Given long duration observation of an object, SAR and ISAR imaging can be feasible, with closely-spaced objects independently resolved. If the array elements are reflector antennas, then once the object's orbit is known, a higher frequency, higher bandwidth waveform can be used for higher resolution imaging, whereas this is not feasible with a traditional phased array.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

The drawings described herein are for illustrative purposes only of selected embodiments and not all possible implementations and are not intended to limit the scope of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Figure 1:
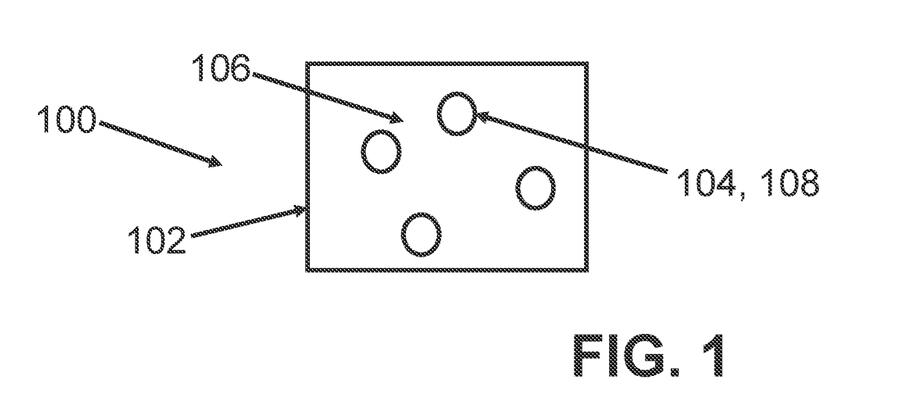
FIG. 1 is a schematic illustrating one embodiment of the system for synchronous object characterization of a space object, and further showing a first sensor array having a plurality of first elements.
Figure 2:
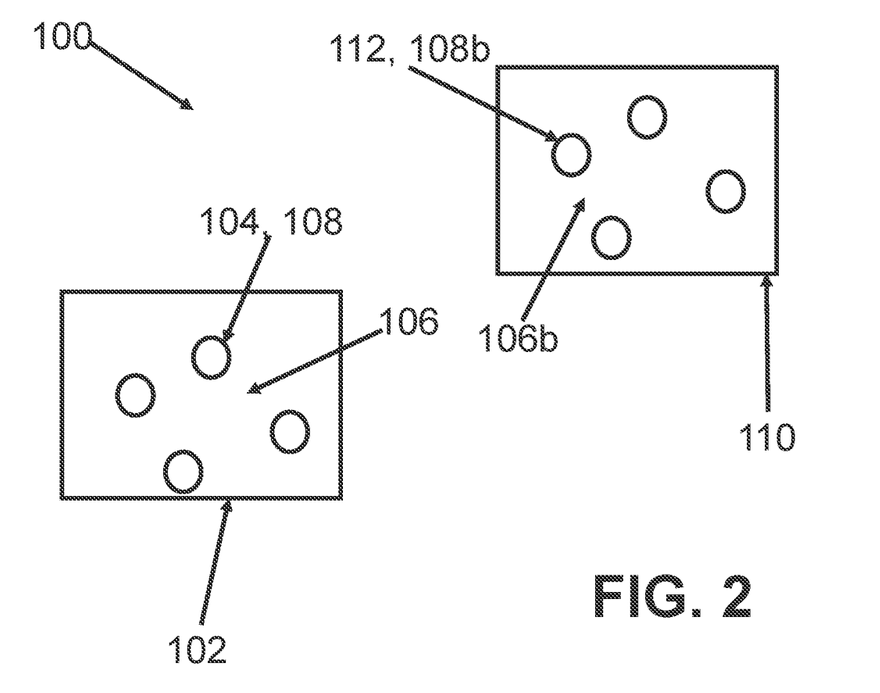
FIG. 2 is a schematic illustrating one embodiment of the systems, and further showing the first sensor array with the plurality of first elements, and a second sensor array with a plurality of second elements.
Figure 3:
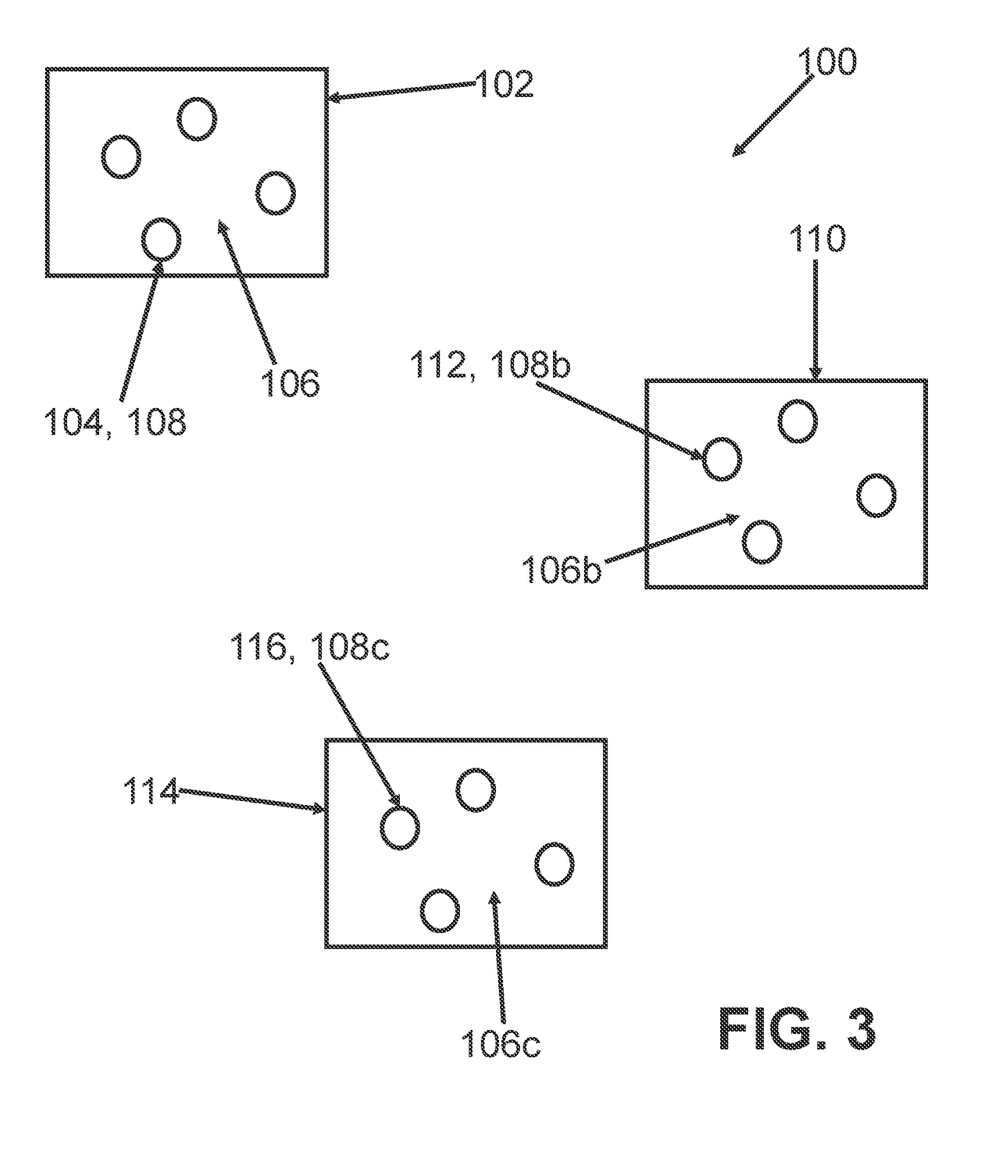
FIG. 3 is a schematic illustrating one embodiment of the systems, and further showing the first sensor array with the plurality of first elements, the second sensor array with the plurality of second elements, and a third sensor array with a plurality of third elements.

With reference to FIGS. 1-3, a radar system 100 for detecting and characterizing one or more space object is shown. In certain examples, the space object is an Earth orbiting object. In addition, the Earth orbiting object can be a station-kept object. A non-limiting example of an Earth orbiting object includes a geostationary communication satellite. Geostationary communications satellites are perhaps the most widely known actively controlled satellites. Their orbital period can nearly match the Earth's rotational period, and thus they can remain in roughly the same location in the GEO arc above the Equator. Operators of these satellites monitor the current orbit position of the satellites and make orbital adjustments when they drift out specification. In addition, they are a special case of geosynchronous orbiters in that their inclination angle is zero.

Synchronous orbits, whether they be at low earth orbit (LEO), medium earth orbit (MEO), geosynchronous Earth orbit (GEO), or highly elliptical orbit (HEO) altitudes, can precisely repeat an apparent path over the earth. Synchronous orbits have an orbital period equal to or multiples of the Earth's rotational period, crossing the same spot repeatedly in a sidereal day. These orbits can be maintained for a variety of reasons, such as certain weather observations. Many of such orbits can be highly inclined, including polar orbits. Specifically, any orbit in which the semi-major axis, a, and period, P, that can satisfy the following equation will be synchronous.

$$a = \sqrt[3]{\mu\left(\frac{P}{2\pi}\right)^2}$$

It should also be appreciated that the radar system 100 can also characterize non-station-kept (non-synchronous) objects in one-pass. This is like U.S. Pat. No. 9,989,634, which describes a comprehensive method for propagating (non-station-kept) objects but includes a widely-spaced coherent radar array on or near the Equator, which is pointing towards the horizon.

With reference to FIG. 1, the radar system 100 can include a first sensor array 102. However, it should be appreciated that a skilled artisan can employ additional arrays, within the scope of this disclosure. The first sensor array 102 can be located within ±10° relative to the Equator. Guaranteed visibility of all of these station-kept satellites using only an elevation scan (e.g., single plane) requires an Equatorial or near-Equatorial location for the first sensor array 102. Otherwise, significant two-dimensional scanning (e.g., elevation and azimuth) is required. Two-dimensional scanning requires more time or multiple simultaneous beams and suffers from increased likelihood that a scanned beam location is changed just before a target would be present.

Figure 4:
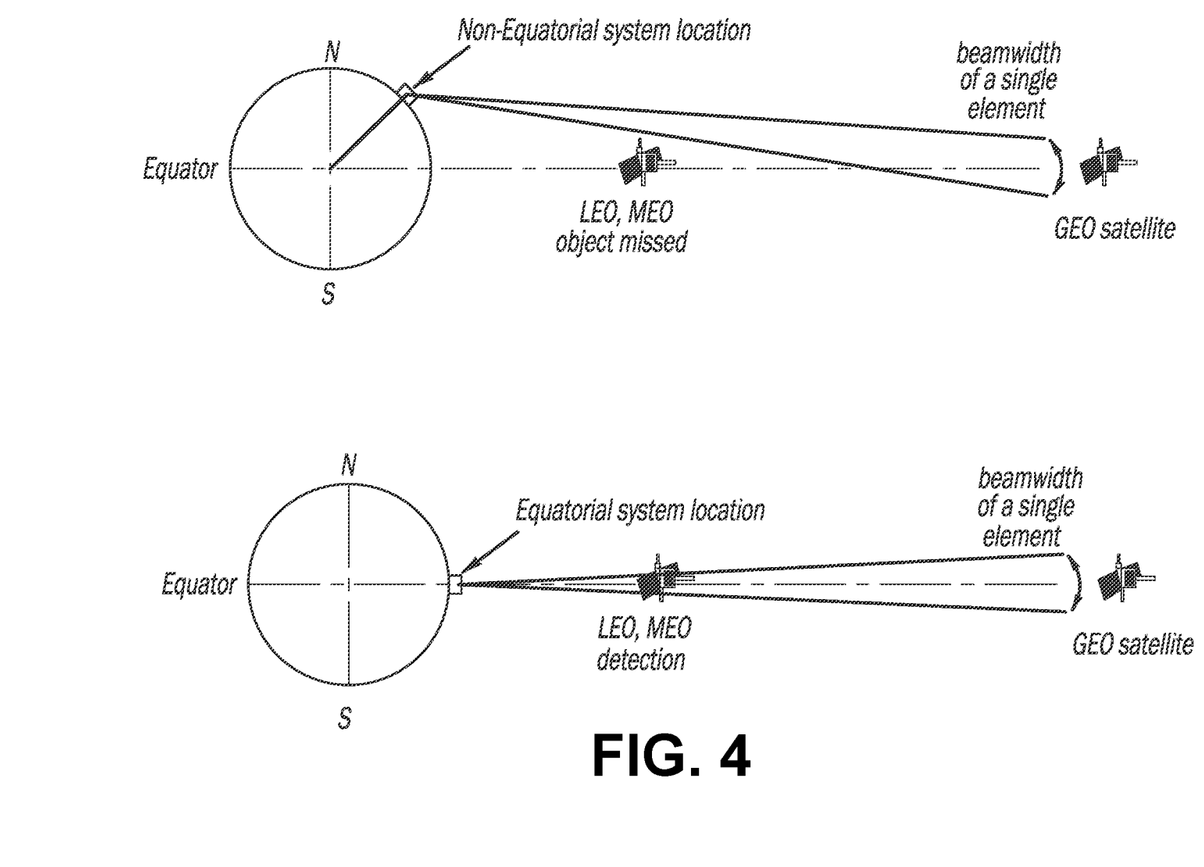
FIG. 4 is a drawing illustrating the system positioned in a non-equatorial location compared to the system positioned in an equatorial location.

An equatorial or near equatorial location has advantages. Due to the range to the fourth power sensitivity loss, highly directive beams can be required for detection of GEO space objects. With reference to FIG. 4, an array location away from the Equator must look back to focus on the Equator, and some objects lower than GEO (or higher) with low inclination can be out of the narrow beam, due to the slant.

The first sensor array 102 can include a plurality of first elements 104. Non-limiting examples of the first elements 104 can include radio frequency (RF) sensors, reflector antennas, phased array antennas, parabolic antennas, and combinations thereof. It should be appreciated that one skilled in the art can employ different sensors and antennas, as desired. The first sensor array 102 can be configured to perform one of a transmitting operation, a receiving operation, and a combination thereof. The transmitting operation can include generating a single transmitting signal. The receiving operation can include generating a receiving signal for the space object. In certain examples, the receiving operation can include generating additional receiving signals for each additional space object. This can occur simultaneously with the first receiving signal.

The plurality of first elements 104 can be arranged in a first widely-spaced configuration 106. The first widely-spaced configuration 106 can including spacing each of the first elements 104 greater than ½ wavelength apart. In certain examples, the first widely-spaced configuration 106 can include spacing each of the first elements 104 at least one thousand wavelengths apart.

The plurality of first elements 104 in the first widely-spaced configuration 106 can have multiple lobes in its radiation pattern. Undesirably, this can result in a grating condition, and in order for the radar system 100 to provide an unambiguous Angle of Arrival (AOA), it can be important that the grating condition is avoided. The grating condition occurs when exactly the same steering vector is obtained for two (or more) distinctly different AOAs. This means that an associated pattern feature, such as a beam or null, can be duplicated at several different AOAs. In traditional phased arrays, the grating condition can be worrisome since with a factorable element pattern, only phases need to match. Additionally, periodicity in a traditional array lattice can essentially ensure that a grating condition will occur for spacing greater than ½ wavelength. Therefore, the grating condition needs to be addressed for the widely-spaced configuration.

The first elements 104 can be formed into one of a first aperiodic lattice 108, a first unequal element pattern, and a combination thereof. The first aperiodic lattice 108 can be used to militate against the grating condition. In particular, if the array elements are not regularly located in 3D space, phasing conditions will not repeat as a function of pattern azimuth and elevation. This means that the many lobes are theoretically distinguishable. Some aperiodic lattice designs can have lobes that are highly correlated, although not perfect grating. At low signal-to-noise ratios (SNR), noise can cause these lobes to be confused. No general aperture synthesis method is known for creating an array with minimum steering vector repetition, but Monte Carlo methods can usually produce adequate lattice designs. More elements 104 in the first sensor array 102 can make this task easier, and clearly with a minimum number of elements 104, for example, three elements, an aperiodic spacing is not possible.

The first unequal element pattern in the array lattice can mitigate the grating problem. Most aperture synthesis, particularly with traditional phased arrays, assumes a repeated element pattern. This allows the element pattern to be factored from the lattice function, greatly simplifying arraying calculations. On the other hand, if the lattice is periodic, then a grating condition is ensured as spacing is increased. By constructing a lattice of elements having different pattern functions, perfect grating conditions cannot exist; for example, different sized reflectors (or differently shaped sub-reflectors) produce spatial variations that do not repeat. Though theoretically any differences prevent exact grating, a practical design requires enough difference so that noise at low SNR does not allow confusion. This method of grating mitigation can be effective when an aperiodic lattice is not possible or has too few elements to be effective (e.g., three elements or less). The first unequal element pattern can also include deliberate precise differential mispointing of each of the first elements 104, which can also be an effective tool for preventing grating ambiguity, although it can reduce array gain and aperture efficiency. In addition, having the array element locations be significantly variable in x, y, and z-dimensions can reduce the potential for grating along with an aperiodic lattice and unequal element patterns. It should be appreciated that if the element locations vary significantly in the z-dimension as well as in x- and y-dimensions, the lattice factor can be more complex, thereby reducing the likelihood of steering vectors repeating. In certain examples, the first elements 104 are not co-linear. If the sensors are co-linear, then no information can be obtained in the other dimension. Therefore, just moving an element in a linear array out of position would enable scanning on orthogonal axes.

The grating condition can be frequency dependent, and a grating condition in one portion of the array's bandwidth can disappear at another. For this reason, a wide bandwidth of operation can be desirable. The first widely-spaced configuration 106 can be so wide in wavelengths that targets can be in an array near field of the first sensor array 102. Additionally, each of the plurality of first elements 104 can be far enough apart on the curved Earth that they each can have different relative pointing in order for energy to converge on a specific volumetric region of interest (e.g., a satellite on the GEO arc).

Now referring to FIG. 2, the radar system 100 can also include a second sensor array 110. In some instances, the second sensor array 110 can be co-located with the first sensor array 102. In other instances, the second sensor array 110 can be not co-located with the first sensor array 102. In certain examples, the second sensor array 110 can be far enough away from the first sensor array 102 to provide isolation, which can protect the sensitive low noise amplifiers in the receiving array from damage when the nearby high-power transmitter amplifiers are active. However, it should be appreciated that the target has to be mutually visible from both the first sensor array 102 and the second sensor array 110. The second sensor array 110 can have a plurality of second elements 112. The plurality of second elements 112 can be identical or similar in structure and/or function to the plurality of first elements 104. The plurality of second elements 112 can be arranged in a second widely-spaced configuration 106b. The second widely-spaced configuration 106b can be identical or similar in structure and/or function to the first widely-spaced configuration 106. The second elements 112 can form one of a second aperiodic lattice 108b, a second unequal element pattern, and a combination thereof. The second aperiodic lattice 108b can be identical or similar in structure and/or function to the first aperiodic lattice 108. The second unequal element pattern can be identical or similar in structure and/or function to first unequal element pattern. In certain examples, the first periodic lattice 108 and the second aperiodic lattice 108b are not identical. This means that their patterns differ, especially in the sidelobe region. Desirably, the radar performance is governed by the product of transmit and receive array patterns, and high sidelobes in one pattern can be suppressed by null regions in the other.

In addition, in certain examples, the first sensor array 102 is configured to be a transmitting array (primarily being configured to perform the transmitting operations), while the second array is configured to be a receiving array (primarily being configured to perform receiving operations). Separating the receiving array from the transmitting array simplifies protecting the sensitive low noise amplifiers in the receiving array from damage when the nearby high-power transmitter amplifiers are active. This also permits the transmit and receive antenna patterns to be different in the sidelobe region.

With reference to FIG. 3, the radar system 100 can further include a third sensor array 114. In some instances, the third sensor array 114 is co-located with at least one of the first sensor array 102 and the second sensor array 110. In other instances, the third sensor array 114 is not co-located with the first sensor array 102 and the second sensor array 110. The third sensor array 114 can include a plurality of third elements 116. The plurality of third elements 116 can be arranged in a third widely-spaced configuration 106c. The third widely-spaced configuration 106c can be identical or similar in structure and/or function to the first widely-spaced configuration 106. However, it should be appreciated that if two (or more) of the widely-spaced configurations are identical then one configuration should be rotated about the boresight axis so that sidelobes of the sensor arrays do not align. In a radar system, the overall system response is the product of receive and transmit antenna patterns. If the sidelobe patterns do not align, then grating or near grating in one is suppressed by the other. The third elements 116 can form one of a third aperiodic lattice 108c, a third unequal element pattern, and a combination thereof. The third aperiodic lattice 108c can be identical or similar in structure and/or function to the first aperiodic lattice 108. The third unequal element pattern can be identical or similar in structure and/or function to the first unequal element pattern. In certain examples, the first sensor array 102 is configured to be a transmitting array (primarily being configured to perform the transmitting operations), while the second sensor array 110 and the third sensor array 114 are configured to be receiving arrays (primarily being configured to perform receiving operations).

One method of operation of the radar system 100 can be thought of as a quasi-stationary array beam that can be slowly stepped along the Equatorial arc. Desirably, it is believed this can provide access to these station-kept objects. The beam can remain fixed at a given elevation along the arc for a dwelling time. The dwelling time can be the time it takes for a potential target to complete one-half orbital revolution. If one is interested in all station-kept orbits from LEO to GEO, then the dwelling time can include about 12 hours (e.g., 11 h 58 m 2 s). This can ensure that the space object, such as a geosynchronous satellite with the same right ascension of the ascending node (RAAN) will pass through the staring beam (or for geostationary, remain within the beam). Additionally, all synchronous orbits with shorter periods but the same RAAN will also pass through this beam, but more than once. Higher objects in the graveyard region can require slightly longer periods requiring a longer dwell time; however, by their presence in graveyard, the great majority of these objects are not station-kept, and thus would drift through any Equatorial staring beam position and the method in U.S. Pat. No. 9,969,634 can be applied.

Such slow scanning in elevation can also result in the detection of non-station-kept objects. As such, the system will see many, if not most, of the same objects that would be found by horizon staring. However, because the staring beam moves occasionally, there is the possibility that it moves away just before a non-station-kept object would be seen. For guaranteed comprehensive access to all non-station-kept Earth-orbiting objects, the system described in U.S. Pat. No. 9,969,634 is needed; for station-kept Earth-orbiting objects the method described herein can be used. It should be appreciated that an array located at non-zero latitude can still be useful, but any deviation from zero will require some cross-elevation scan positions for comprehensive coverage. Three radar systems such as the one just described, placed about 120 degrees apart along the Equator could form a global surveillance system capable of detecting all synchronous satellites.

The number of elements 104, 112, 116 in each array can be arbitrary but must be more than two for 2D cross range measurement. Additional elements 104, 112, 116 are desirable for two reasons. First, radar performance is proportional to the number of elements 104, 112, 116 cubed (assumes that the transmit and receive arrays have the same number of elements; otherwise, it is proportional to M*N² where M is the number of receive antennas and N is the number of transmit antennas). Because of the radar range-to-the-fourth-power loss of sensitivity, more antennas are helpful in increasing effective isotropic radiated power (EIRP) and antenna gain-to-noise-temperature (G/T) needed to detect small satellites at GEO altitude. Secondly, as the wide aperture is filled, the array pattern approaches that of a uniformly illuminated surface, and potential grating is mitigated.

Figure 5:
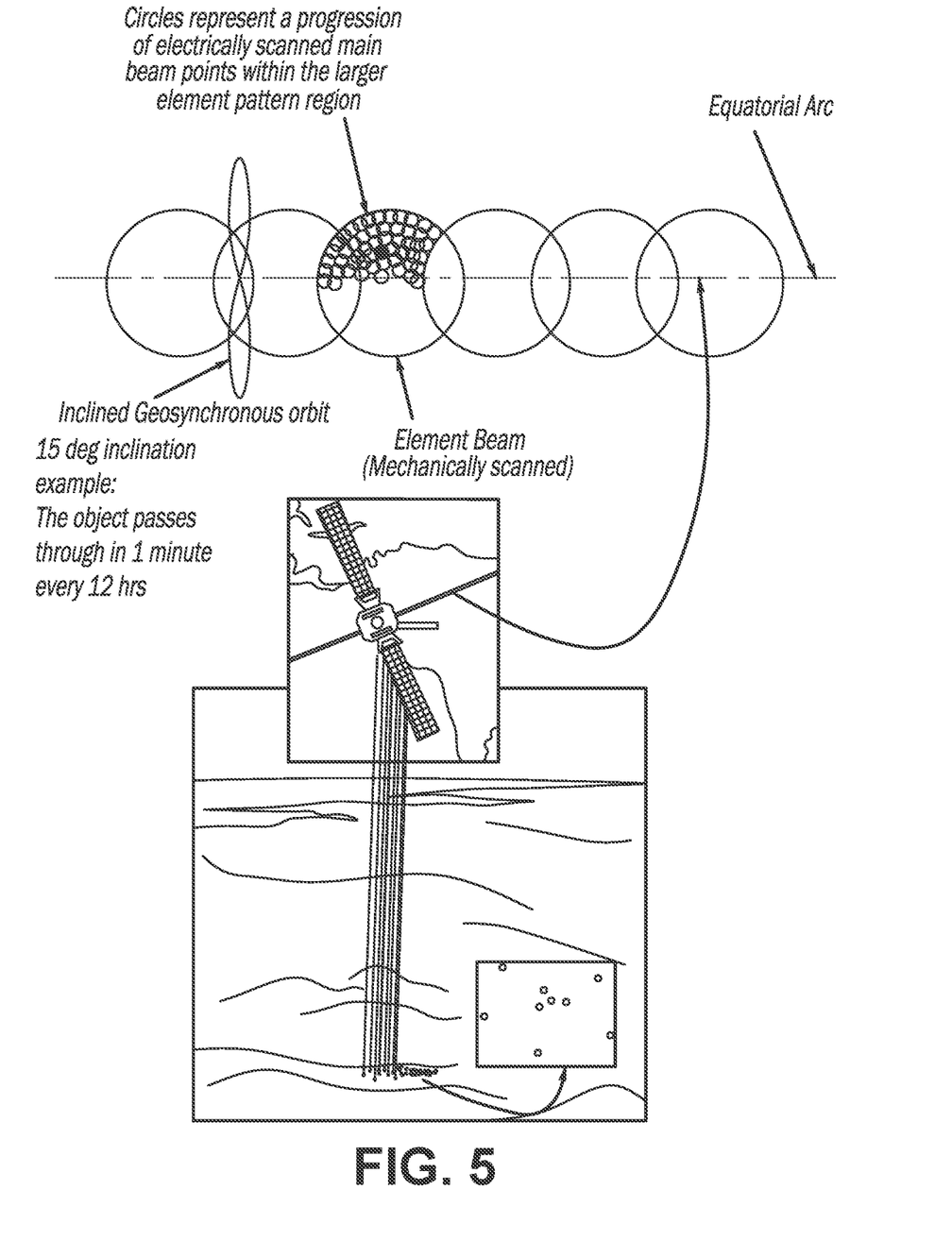
FIG. 5 is a drawing illustrating a notional depiction of the system having an aperiodic lattice.

With reference to FIG. 5, a notional depiction of an example of one of the arrays is shown. It is not restricted to the depicted orbits. The number of elements in the array is scalable but must be three or more for 2D cross range measurement. The array shown in FIG. 5 has nine elements distributed over a one-mile diameter area.

Figure 6:
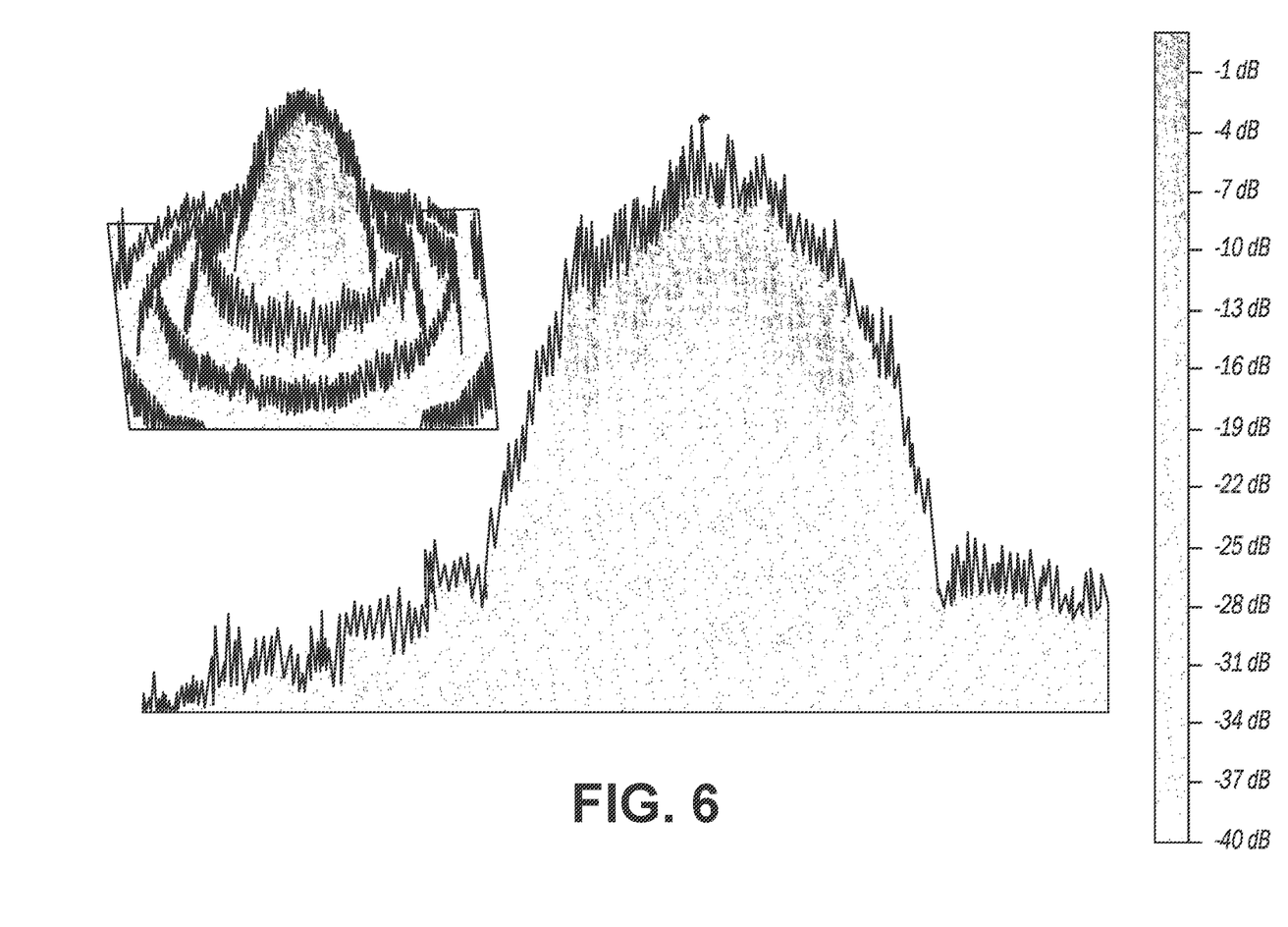
FIG. 6 graphically depicts array patterns of the system at X-band, according to one embodiment, and further showing the array pattern with a space object.

Now referring to FIG. 6, with only nine elements, the pattern, at X-band, can be very ragged. The main beam is the highest one of the fine needle-like lobes. The broader portion of the pattern, about 0.14 degree in width, is that of a single element. With nominal geosynchronous satellite spacing of 2 degrees, the total radiated power is well confined. It should be appreciated that at the GEO arc distance, this is a near-field pattern; far field (for this mile-wide array), as it is ordinarily defined, is five times further, half the distance to the moon.

In many radar applications, such a ragged pattern would be useless for isolating a target or for SAR/ISAR imaging due to clutter from objects near the target of interest. However, in the present application of looking up, there is no reflective background to create clutter returns. Instead, ambiguity mitigation techniques are needed to uniquely identify the specific lobe on a target, then electronically steer the main lobe onto the target. The system 100 can generate the ISAR image using the high-resolution main beam and the ability to differentiate grating lobes due to at least one of the first aperiodic lattice and the first unequal pattern. As in a traditional array, the main lobe can be electronically steered anywhere within the element pattern.

Figure 7:
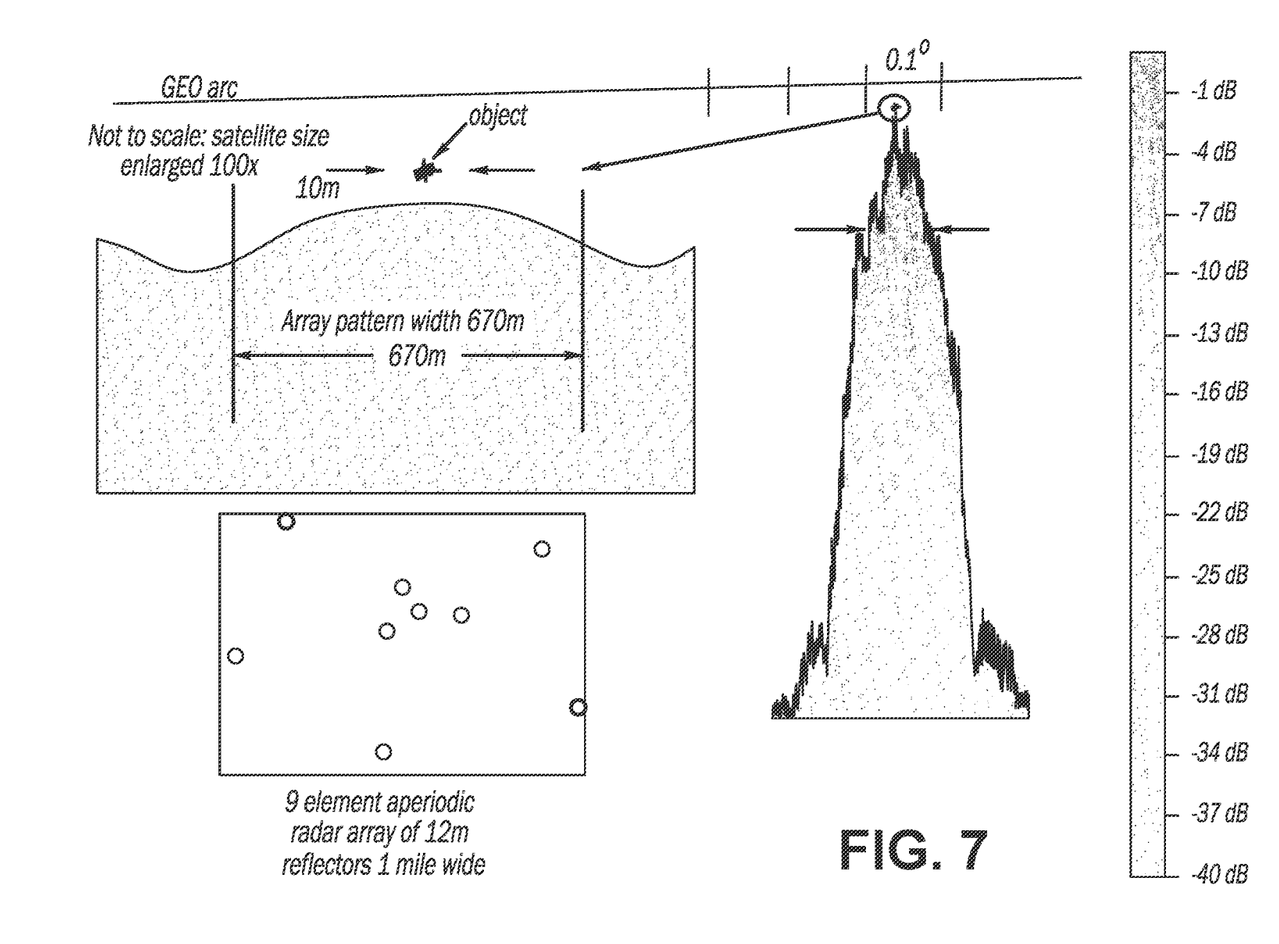
FIG. 7 schematically depicts operation and configuration of the system, according to one embodiment, and further showing the array pattern with a space object.

International agreements provide for 2° spacing between satellites of different operators. However, some operators choose to assume the risk of collision and pack several satellites within their 2° slot, some only 0.1° degrees (or 73 km) apart. With reference to FIG. 7, one embodiment of the array pattern of the system 100 with respect to the GEO is shown. The notional illustrative element beamwidth at GEO is about 0.14°, 90 km wide at GEO, for 12-meter reflector antennas at X-band. Thus, the parameters chosen can be well-suited for isolating individual satellites in the radar beam. Within the 0.14° beamwidth, the needle-like array main beam exists along with other secondary lobes.

Besides very accurate angular resolution as a result of the wide element spacing, the system 100 can provide very high directed energy on the object while avoiding nearby non-targeted ones. Range and object size capability are EIRP dependent. Desirably, the radar system 100 can be configured to operate in wideband, thereby allowing the system 100 to transmit in frequencies outside the narrow band. For a nine-element system 100 of 12-meter elements designed for GEO, the system 100 can provide about 500 GW (117 dBW).

A higher duty cycle provides more energy on the target. Energy on the target is power x time. The radar system 100 can have a 90% duty cycle. In certain examples, the radar system 100 can be configured to provide countermeasures. The countermeasures can include disrupting space objects. A nonlimiting example can include a satellite that has been deemed unfriendly. The disrupting can be performed by using the combined power and resolution of the array aperture. The disrupting can include directing strong interfering signals at receiving functions of the space object. The strong interfering signals can overpower the receiving functions of the space object, which can impair the space object.

The radar system 100 can be used to perform several different operations, including a first mode, a second mode, a third mode, and a fourth mode. In the first three modes, the elements can be incrementally scanned across the GEO arc, a beamwidth at a time, or the element can be pointed toward a region of interest. If the elements are reflector antennas, they can be mechanically positioned. The fourth mode can include queued tracking and imaging.

The first mode can be used for exploration of the GEO arc. As shown in FIG. 5, the main beam can be scanned for the Earth orbital object. It is believed that this mode can be useful in determining whether an active satellite is threatened by the presence of another object, including a dead satellite or debris. When a target is detected, the AOA information is used to determine its 3D position. Position differentials over time can be used to establish cross-velocity. If the object is rotating or tumbling, an ISAR image can be generated. In certain examples, the orbits can be determined as described in U.S. Pat. No. 9,969,634. Additionally, the object can be SAR or ISAR imaged at a different frequency.

The second mode can be used for a comprehensive search for synchronous satellites and can include an incremented staring mode. The array element pattern can be scanned across the sky along the Equatorial plane, one element beamwidth at a time, with the array staring there long enough for any synchronous satellite with that right ascension to pass through the beam. The operation can be similar to what is described in U.S. Pat. No. 9,969,634, where the satellite's orbit can be determined with a few pulses. This mode can be effective for all synchronous satellites, including those in MEO and LEO. The dwell time at a particular elevation (associated with a satellite's Right Ascension) can be adjusted for target satellite altitude, but a roughly 12-hour dwell will encompass all from GEO downward. Lower altitude satellites will have a shorter revisit time, and thus if these are the principal targets, the dwell time can be shortened. Even though at present time there is little interest in synchronous orbits higher than GEO, the dwell time longer than 12 hours can be applied as desired.

The third mode can include multi-static operations. While multi-static radar principles are well known, there are significant advantages for using the radar system 100 in such an application. With the first sensor array 102, the second sensor array 110, and the third sensor array 114, instantaneous orbit determination is possible. Orbit determination requires knowledge of six parameters, object position [x, y, z] and velocity [ẋ, ẏ, ż] Each receiving site can determine position using range and AOA, but only the line-of-sight velocity using Doppler shift. In a monostatic system, at least two separate measurements of the object are needed for orbit determination, as discussed earlier. Doppler shift for the multi-static case is significantly different from monostatic, since two changing ranges are involved—that from the transmitter to the object and that from the object to the receiving site, $$f_d = \frac{f(v_T + v_R)}{c}.$$

Figures 8, 9:
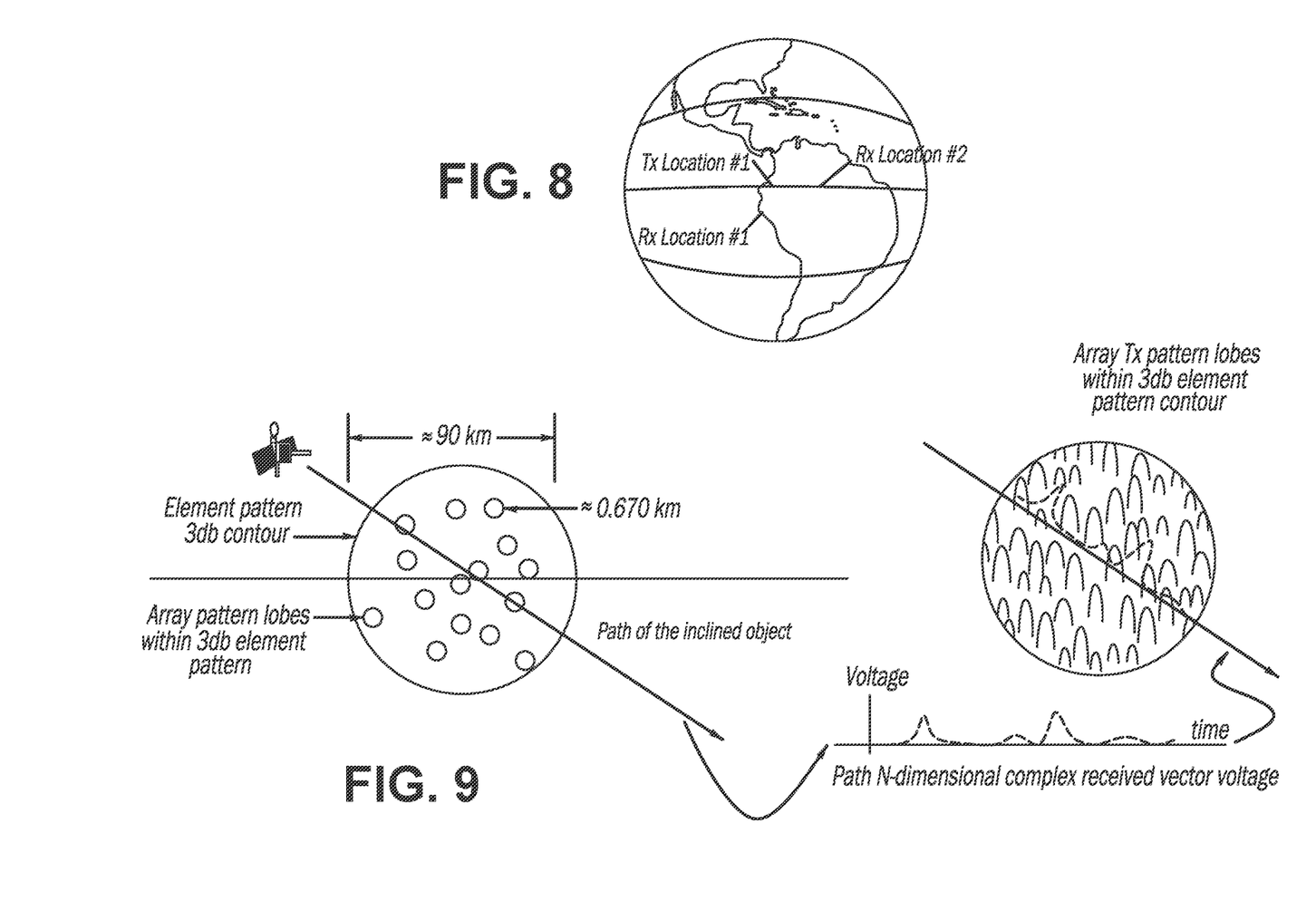
FIG. 8 is a schematic illustrating the Earth, and further showing preferable locations for the system.
FIG. 9 is a drawing illustrating a method of tracking a space object using the system, according to one embodiment.

With three spatially distinct receiving locations, such as illustrated in FIG. 8, one or more on the Equator and at least one of which is out of the equatorial plane, for example, at 5 to 10 degrees latitude, all three velocity components can be 'simultaneously' measured. Consequently, this option would enable 'instantaneous' orbit determination. In a particular example, the first sensor array is configured to transmit, while the second sensor array 110, a third sensor array 114, and a fourth sensor array is configured to receive (acting as the three spatially distinct receiving locations, which permits the 'instantaneous' orbit determination).

The system 100 can still determine the velocity and positional components of the space object during one pass through the array beam where the first array 102 is configured to transmit and receive. In addition, the system can obtain the velocity and positional components during the one pass if the first sensor array 102 is configured to transmit, while the second sensor array 110 is configured to receive.

FIG. 5 notionally illustrates a 15° inclined orbit. This orbit is such that most of the time, the satellite is far from the equatorial plane, and each equatorial crossing takes only about one minute. Because of the many lobes, multiple AOA estimates can be combined, and ambiguity resolution enhanced. FIG. 9 illustrates this process, with parameters consistent with a one mile wide, 9-reflector aperiodic array near-field pattern at GEO altitude. At the left side, a satellite is shown traversing the staring beam. Numerous needle-like lobes fill the element pattern 3 dB contour, which is about 90 km wide. A drawing from an actual pattern for this array at 10 GHz is given on the right-hand side, with the notional satellite path shown. The steering vector voltages as a function of time due to this passage are notionally illustrated. These can provide a continual measurement that will uniquely define the path taken by the target. For the parameters being considered, which are for illustration only, this stepped mode of search (Mode 2) would require roughly 631 days to comprehensively scan the visible GEO arc from horizon to horizon. At least one other such array in the opposite hemisphere would be needed for comprehensive coverage.

Cross range obtained from AOA multiplied by the target range can be incorrect unless the AOA is corrected for tropospheric effects. Both first and second order effects are present and must be addressed. For elevation angles away from zenith, it is well known that a radio wave is bent downward by refraction toward the denser air conforming to the curvature of the earth. However, the atmosphere/troposphere is neither static nor homogeneous and paths taken by signals to and from the array elements can vary from one another. To obtain very high accuracy AOA, it is necessary that these path contributions be measured and corrected.

An atmospheric mitigation process such as described in 2011 Martin, Minear et al. AIAA SpaceOps: Exploration, Scientific Utilization, and Technology Development Chapter 24, can be adapted for this tropospheric path correction purpose. Satellites are profusely present along the GEO arc, and most active ones provide not only 'payload' downlink signals, many with Earth coverage, but also beacon signals. Since these satellites are actively station-kept, their position in space is well known. Baseband delays and steering vector phase at the downlink frequency can be scaled to the radar frequency since the troposphere is basically non-dispersive at the frequencies being considered.

The fourth mode of operation can include queued tracking and imaging. The fourth mode is designed to address an important need for characterizing near-earth objects such as orbit crossing asteroids or comets or, for example, monitoring rocket and satellite launches. In this mode some other system, such as optical telescope sky surveys, detect an object potentially earth threatening that needs to be immediately characterized as to precise orbit and then ISAR imaged (the recently destroyed Arecibo telescope was one of those world-wide that performed this function). Wide-field-of-view optical telescopes are tasked world-wide to survey the sky for new objects that due to limitations of optical telescopes can only appear as points of light. When something new is observed, other resources are brought to bear, such as radio telescopes that can follow and image the object. This is a queued and tasked mode. Notably, the subject widely spaced array has the power and resolution capability to obtain a precise orbit and produce an ISAR image of the object. Furthermore, a rocket or satellite launch could also be followed provided queuing and tasking orders from some other authority, again with the array able to obtain orbital parameters and images of the object. In particular, the system 100 can be configured to receive an order from an outside authority (e.g., optical telescope sky surveys) to track a near-Earth object. Upon receiving the order, the system can be configured to track the near-Earth object. Then, the system can be configured to at least one of (1) obtain orbital parameters and (2) generate an ISAR image of the near-earth object. Additional characterization of the object can include polarization and cross polarization responses and frequency dependent variation of reflection.

It is also notable that important information about the distribution of water vapor in the troposphere can be inferred from the propagation variations. The radar system 100 can be configured to receive and could follow satellite downlink signals from a known source, such as a GPS satellite, obtaining a continuous measurement of this variation and thus water vapor content along the pathways. This can be used to generate a model of the distribution of water vapor in the troposphere. GPS satellites can be particularly valuable in this regard both because their orbits are so precisely known and because they are widely distributed over the sky. Any satellites with known orbits and available downlinks, such as a beacon, are also useful.

Figure 10:
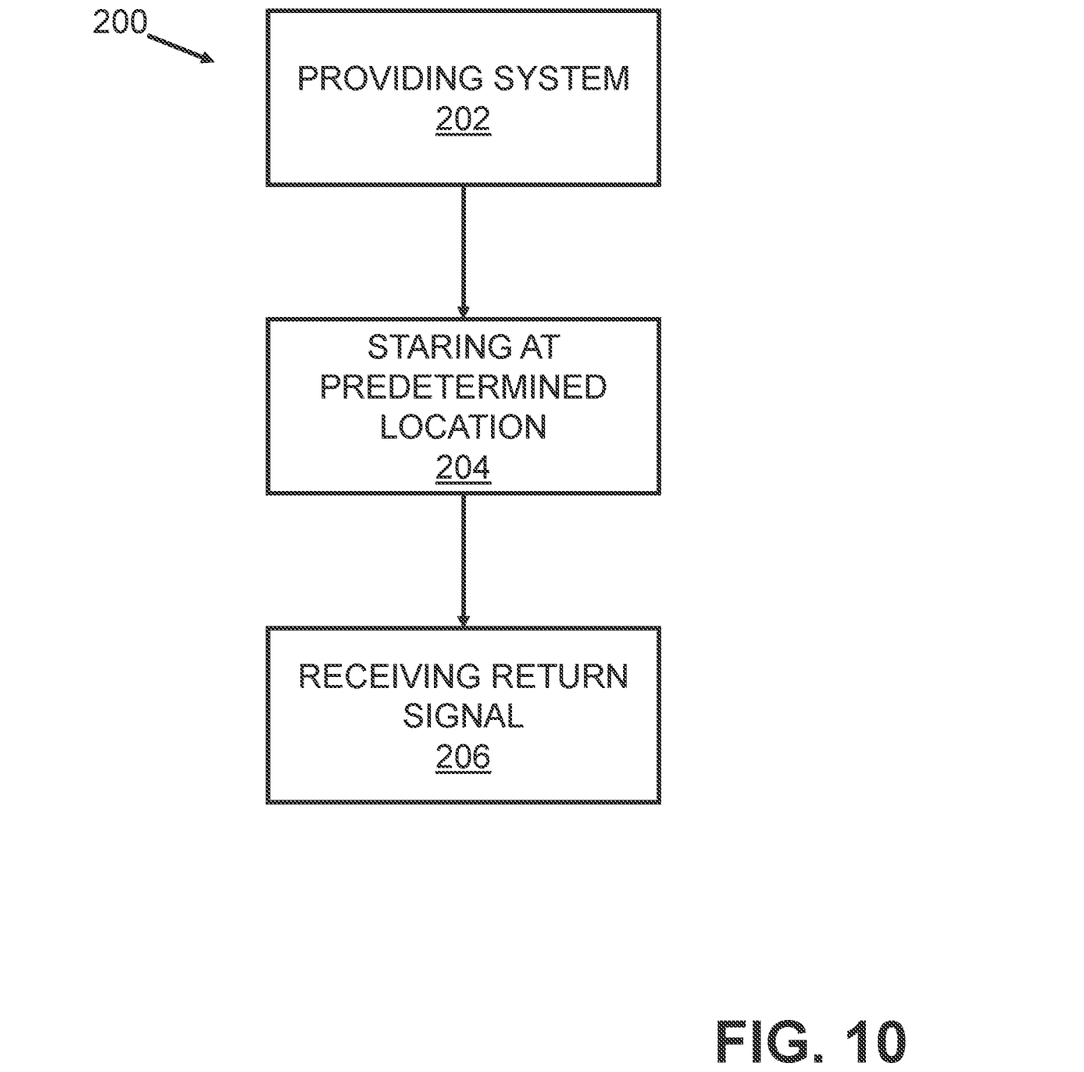
FIG. 10 is flowchart illustrating an embodiment of a method for characterization of a space object using the system.
Figure 11:
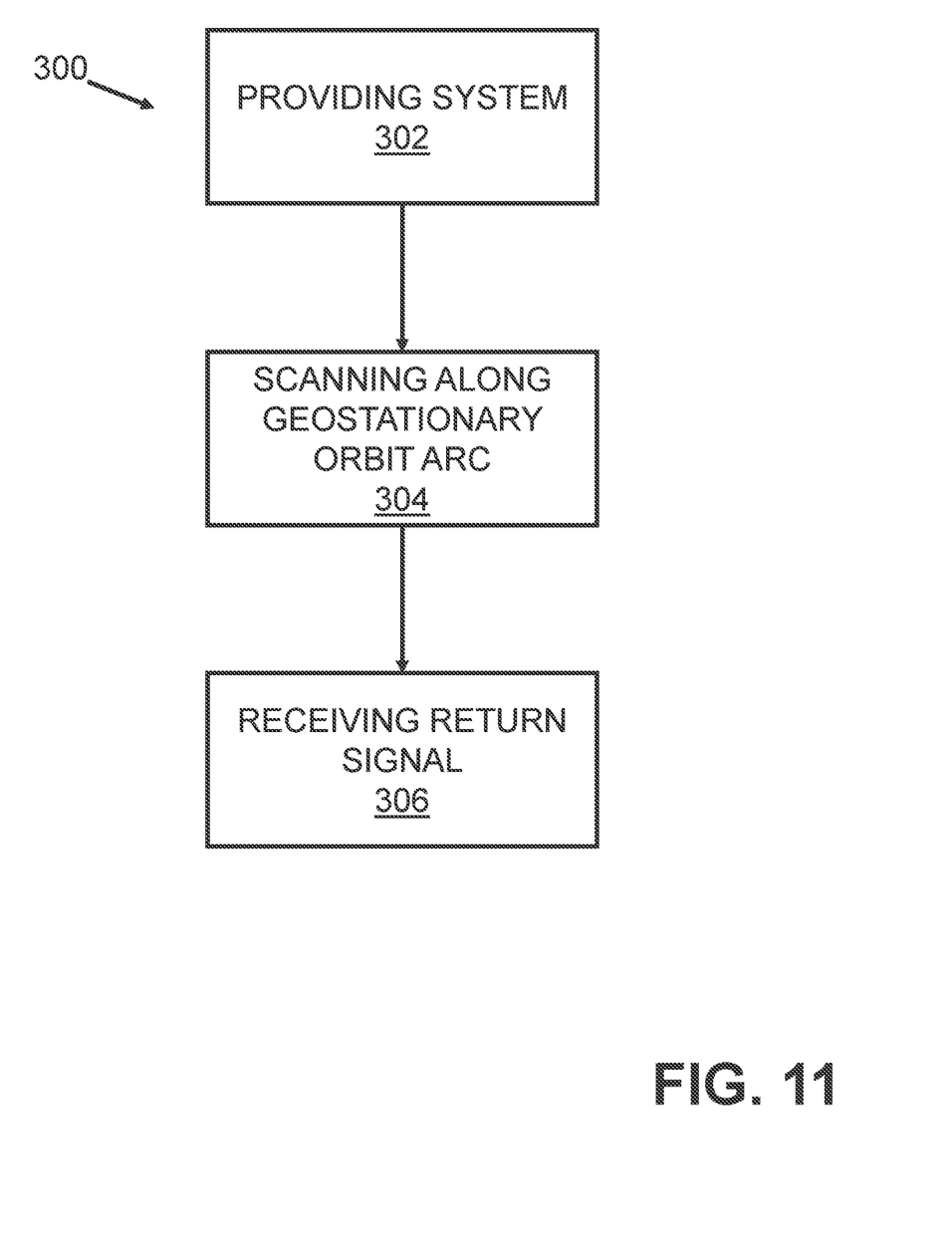
FIG. 11 is a flowchart illustrating another embodiment of a method for characterization of the space object using the system.

With reference to FIGS. 10-11, methods for synchronous object characterization of an Earth-orbiting object are shown. With reference to FIG. 10, a method 200 includes a step 202 of providing the radar system 100. In a step 204, the radar system 100 is configured to stare at a predetermined position in the geostationary arc by broadcasting a first beam. The first beam can include a first detection signal. In a step 208, the radar system 100 can be configured to receive at least one return signal created by the first detecting signal reflecting off of the Earth orbiting object.

Now referring to FIG. 11, a method for 300 includes a step 302 of providing the radar system 100. In a step 304, the radar system 100 can be configured to perform an incremented scan of the geostationary arc, by scanning each predetermined position for a dwelling time. This can be done by broadcasting the first beam at each predetermined position. As mentioned above the dwelling time can be about 12 hours. In a step 306, the radar system 100 can be configured to receive at least one return signal created by the first detection signal reflecting off of the Earth orbiting object.

Advantageously, the radar system 100 and methods can be used to detect, characterize, and image objects in synchronous orbits. Also, by using the different modes, the radar system 100 can be used to detect, characterize, and image other objects around a target. Desirably this can permit the radar system 100 and methods to assist in avoiding collision with other co-orbiters. In addition, the radar system 100 can be capable of disrupting an unfriendly object.

While certain representative embodiments and details have been shown for purposes of illustrating the invention, it will be apparent to those skilled in the art that various changes can be made without departing from the scope of the disclosure, which is further described in the following appended claims.

What is claimed is:

1. A radar system for detecting and characterizing at least one space object, comprising:
   a first sensor array having a plurality of first elements in a first widely-spaced configuration, and the first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof, and
   wherein the first unequal pattern includes one of differently sized reflectors, differently shaped sub-reflectors, deliberately precise differentially mispointed first elements, and combinations thereof.

2. The radar system of claim 1, wherein the receiving operation includes generating a first receiving signal for one or more space objects.

3. The radar system of claim 1, wherein the first widely-spaced configuration can include spacing each of the first elements at least one thousand wavelengths apart.

4. The radar system of claim 1, wherein the system is configured operate within a wideband, thereby allowing the system to transmit in frequencies outside narrowband.

5. The radar system of claim 1, further comprising a second sensor array having a plurality of second elements in a second widely-spaced configuration, the second elements forming one of a second aperiodic lattice, a second unequal element pattern, and a combination thereof, and wherein the second elements are not co-linear with respect to x- and y-axes thereof.

6. The system of claim 5, wherein the first sensor array is configured to perform the transmitting operation and the second sensor array is configured to perform a receiving operation.

7. The system of claim 6, wherein the first sensor array is not co-located with the second sensor array.

8. A radar system for detecting and characterizing at least one space object, comprising:
   a first sensor array having a plurality of first elements in a first widely-spaced configuration, and the first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof, and
   wherein the plurality of first elements includes three elements, and wherein the first elements are arranged in an unequal element pattern and the first elements are not arranged in the first aperiodic lattice.

9. A radar system for detecting and characterizing at least one space object, comprising:
   first elements forming one of a first aperiodic lattice, a first unequal elements pattern, and first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof; and
   a second sensor array having a plurality of second elements in a second widely-spaced configuration, the second elements forming one of a second aperiodic lattice, a second unequal element pattern, and a combination thereof, and wherein the second elements are not co-linear with respect to x- and y-axes thereof, and
   wherein the first aperiodic lattice is not identical to the second aperiodic lattice.

10. A radar system for detecting and characterizing at least one space object, comprising:
    a first sensor array having a plurality of first elements in a first widely-spaced configuration, the first elements forming one of a first aperiodic lattice, a first unequal element pattern, and a combination thereof, and the first sensor array configured to perform one of a transmitting operation, a receiving operation, and a combination thereof,
    wherein the first elements are not co-linear with respect to x- and y-axes thereof; and
    a second sensor array having a plurality of second elements in a second widely-spaced configuration, the second elements forming one of a second aperiodic lattice, a second unequal element pattern, and a combination thereof, and wherein the second elements are not co-linear with respect to x- and y-axes thereof,
    wherein the first sensor array is configured to perform the transmitting operation and the second sensor array is configured to perform a receiving operation, and
    wherein velocity and positional components of the space object can be measured during one pass through an array beam during the transmitting operation, thereby enabling one pass orbit determination of the at least one space object.

11. A radar system for detecting and characterizing at least one space object, comprising:
    a first sensor array having a plurality of first elements in a first widely-spaced configuration, and first elements forming one of a first aperiodic lattice, a first unequal element pattern, and a combination thereof, and the first sensor array configured to perform one of a transmitting operation, a receiving operation, and a combination thereof,
    wherein the first elements are not co-linear with respect to x- and y-axes thereof,
    a second sensor array having a plurality of second elements in a second widely-spaced configuration, the second elements forming one of a second aperiodic lattice, a second unequal element pattern, and a combination thereof, and wherein the second elements are not co-linear with respect to x- and y-axes thereof; and
    a third sensor array having a plurality of third elements in a third widely-spaced configuration, the third elements forming one of a third aperiodic lattice, a third unequal element pattern, and a combination thereof, and wherein the third elements are not co-linear with respect to x- and y-axes thereof.

12. A radar system for detecting and characterizing at least one space object, comprising:
   a first sensor array having a plurality of first elements in a first widely-spaced configuration, and first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof;
   a second sensor array having a plurality of second elements in a second widely-spaced configuration, the second elements forming one of a second aperiodic lattice, a second unequal element pattern, and a combination thereof, and wherein the second elements are not co-linear with respect to x- and y-axes thereof; and
   a third sensor array having a plurality of third elements in a third widely-spaced configuration, the third elements forming one of a third aperiodic lattice, a third unequal element pattern, and a combination thereof, and wherein the third elements are not co-linear with respect to x- and y-axes thereof,
   wherein the first sensor array is configured to perform the transmitting operation, each of the second sensor array and the third sensor array is configured to perform a receiving operation, and
   wherein the system further includes a fourth sensor array configured to perform the receiving operation, and wherein velocity and positional components of the space object can be measured during one pulse while the object is crossing a beam of the element pattern, thereby enabling one pulse orbit determination of the at least one space object.

13. A radar system for detecting and characterizing at least one space object, comprising:
   a first sensor array having a plurality of first elements in a first widely-spaced configuration, and first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof,
   wherein the first widely-spaced configuration provides a high-resolution main beam, and
   wherein the system is configured to generate an inverse synthetic-aperture radar (ISAR) image using the high-resolution main beam and an ability to differentiate grating lobes due to at least one of the first aperiodic lattice and the first unequal pattern.

14. A radar system for detecting and characterizing at least one space object, comprising:
   a first sensor array having a plurality of first elements in a first widely-spaced configuration, the first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof, and
   wherein the system can be further configured to receive an order to track a near-Earth object as the at least one space object, track the near-earth object, and at least one of characterize and image the near-Earth object.

15. A radar system for detecting and characterizing at least one space object, comprising:
   a first sensor array having a plurality of first elements in a first widely-spaced configuration, and first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof, and
   wherein the at least one space object is an unfriendly space object, and the system is configured to disrupt the space object using combined power and resolution of the system.

16. A radar system for detecting and characterizing at least one space object, comprising:
   a first sensor array having a plurality of first elements in a first widely-spaced configuration, the first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof,
   wherein the system is configured to perform high precision angle of arrival by mitigation of tropospheric phase differential effects by following downlink signals from a known source.

17. A radar system for detecting and characterizing at least one space object, comprising:
   a first sensor array having a plurality of first elements in a first widely-spaced configuration, the first elements forming one of a first aperiodic lattice, a first unequal element pattern, and a combination thereof, and the first sensor array configured to perform one of a transmitting operation, a receiving operation, and a combination thereof,
   wherein the first elements are not co-linear with respect to x- and y-axes thereof, and
   wherein the system is configured to collect water vapor distribution data in the atmosphere by following downlink signals from a known source.

18. A method for detecting and characterizing at least one Earth orbiting object, comprising:
   providing a radar system including: a first sensor array having a plurality of first elements in a
      first widely-spaced configuration, and the first elements forming one of a first aperiodic lattice, a first unequal element pattern, and a combination thereof, and the first sensor array configured to perform one of a transmitting operation, a receiving operation, and a combination thereof,
      wherein the first elements are not co-linear with respect to x- and y-axes thereof,
      wherein the first unequal pattern includes one of differently sized reflectors, differently shaped sub-reflectors, deliberately precise differentially mispointed first elements, and combinations thereof,
   staring at a predetermined position in a geostationary arc by broadcasting a first beam, the first beam including a first detection signal; and receiving at least one return signal created by the first detecting signal reflecting off the Earth orbiting object.

19. The method of claim 18, wherein staring at the predetermined position in the geostationary arc includes scanning additional positions along the geostationary arc for a dwelling time.

\* \* \* \* \*